(12) United States Patent
Hamashoji

(10) Patent No.: US 11,716,436 B2
(45) Date of Patent: Aug. 1, 2023

(54) APPARATUS, METHOD, AND SYSTEM FOR PROCESSING IMAGE, AND RECORDING MEDIUM

(71) Applicant: Hiroki Hamashoji, Kanagawa (JP)

(72) Inventor: Hiroki Hamashoji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/805,900

(22) Filed: Jun. 8, 2022

(65) Prior Publication Data

US 2022/0400188 A1 Dec. 15, 2022

(30) Foreign Application Priority Data

Jun. 15, 2021 (JP) .................................. 2021-099638

(51) Int. Cl.
*H04N 1/60* (2006.01)
*H04N 1/50* (2006.01)

(52) U.S. Cl.
CPC ............. *H04N 1/6033* (2013.01); *H04N 1/50* (2013.01); *H04N 1/6072* (2013.01)

(58) Field of Classification Search
CPC ........................... H04N 1/6033; H04N 1/6072
See application file for complete search history.

(56) References Cited

U.S. PATENT DOCUMENTS

| | | | | |
|---|---|---|---|---|
| 5,946,412 A * | 8/1999 | Nishikawa | ............ | G06T 11/001 382/167 |
| 7,755,796 B1 * | 7/2010 | Phillips | .................... | H04N 1/60 358/1.9 |
| 11,030,497 B2 * | 6/2021 | Ozawa | ............... | H04N 1/00042 |
| 2005/0275856 A1 * | 12/2005 | Oki | .................... | G06K 15/1852 358/1.9 |
| 2006/0072134 A1 * | 4/2006 | Umezawa | ............ | H04N 1/6011 358/1.9 |
| 2006/0072135 A1 * | 4/2006 | Umezawa | ............ | H04N 1/0044 358/1.9 |
| 2007/0177173 A1 * | 8/2007 | Nishikawa | ........... | H04N 1/6058 358/1.9 |
| 2008/0180706 A1 * | 7/2008 | Yanagi | ................. | H04N 1/6033 358/1.9 |
| 2008/0204774 A1 * | 8/2008 | Matsushima | ........ | H04N 1/6072 358/1.9 |

(Continued)

FOREIGN PATENT DOCUMENTS

| | | | | | |
|---|---|---|---|---|---|
| CA | | 2643245 A1 * | 5/2009 | ........... | H04N 1/6033 |
| EP | | 769869 A2 * | 4/1997 | ........... | H04N 1/4078 |

(Continued)

OTHER PUBLICATIONS

Extended European Search Report for 22178238.6 dated Nov. 2, 2022.

*Primary Examiner* — Ted W Barnes
(74) *Attorney, Agent, or Firm* — Ipusa, PLLC

(57) ABSTRACT

An apparatus for processing an image, includes circuitry configured to: input a first image indicating a target color; input a second image formed by an image forming device to be subjected to adjustment; determine types of objects; and compare the first image and the second image and generate, for each of the types of the objects, a color conversion parameter, based on a correspondence between a chromaticity value in the first image and a chromaticity value in the second image.

18 Claims, 8 Drawing Sheets

(56) References Cited

U.S. PATENT DOCUMENTS

| | | | |
|---|---|---|---|
| 2009/0310149 A1* | 12/2009 | Kawasaki | H04N 1/6022 358/1.8 |
| 2012/0092734 A1* | 4/2012 | Yamada | H04N 1/00278 358/518 |
| 2013/0027759 A1* | 1/2013 | Nakamura | H04N 1/6055 358/505 |
| 2013/0120774 A1* | 5/2013 | Kouguchi | G06K 15/188 358/1.9 |
| 2015/0029524 A1* | 1/2015 | Shin | G06K 15/1878 358/1.9 |
| 2015/0334267 A1* | 11/2015 | Hirakawa | H04N 5/144 348/242 |
| 2016/0077779 A1* | 3/2016 | Kim | H04N 1/642 358/1.9 |
| 2019/0052774 A1* | 2/2019 | Oka | G06K 15/1878 |
| 2019/0356819 A1* | 11/2019 | Une | H04N 1/6072 |
| 2020/0097783 A1* | 3/2020 | Inoue | G06K 15/1851 |
| 2020/0412915 A1* | 12/2020 | Suzuki | H04N 1/6008 |

FOREIGN PATENT DOCUMENTS

| | | | | |
|---|---|---|---|---|
| JP | 07222008 A | * | 8/1995 | G06T 11/001 |
| JP | 2013-030996 | | 2/2013 | |
| JP | 2013-232750 | | 11/2013 | |
| JP | 2013232750 A | * | 11/2013 | |
| JP | 2016-139867 | | 8/2016 | |
| JP | 2016139867 A | * | 8/2016 | B41J 2/525 |

* cited by examiner

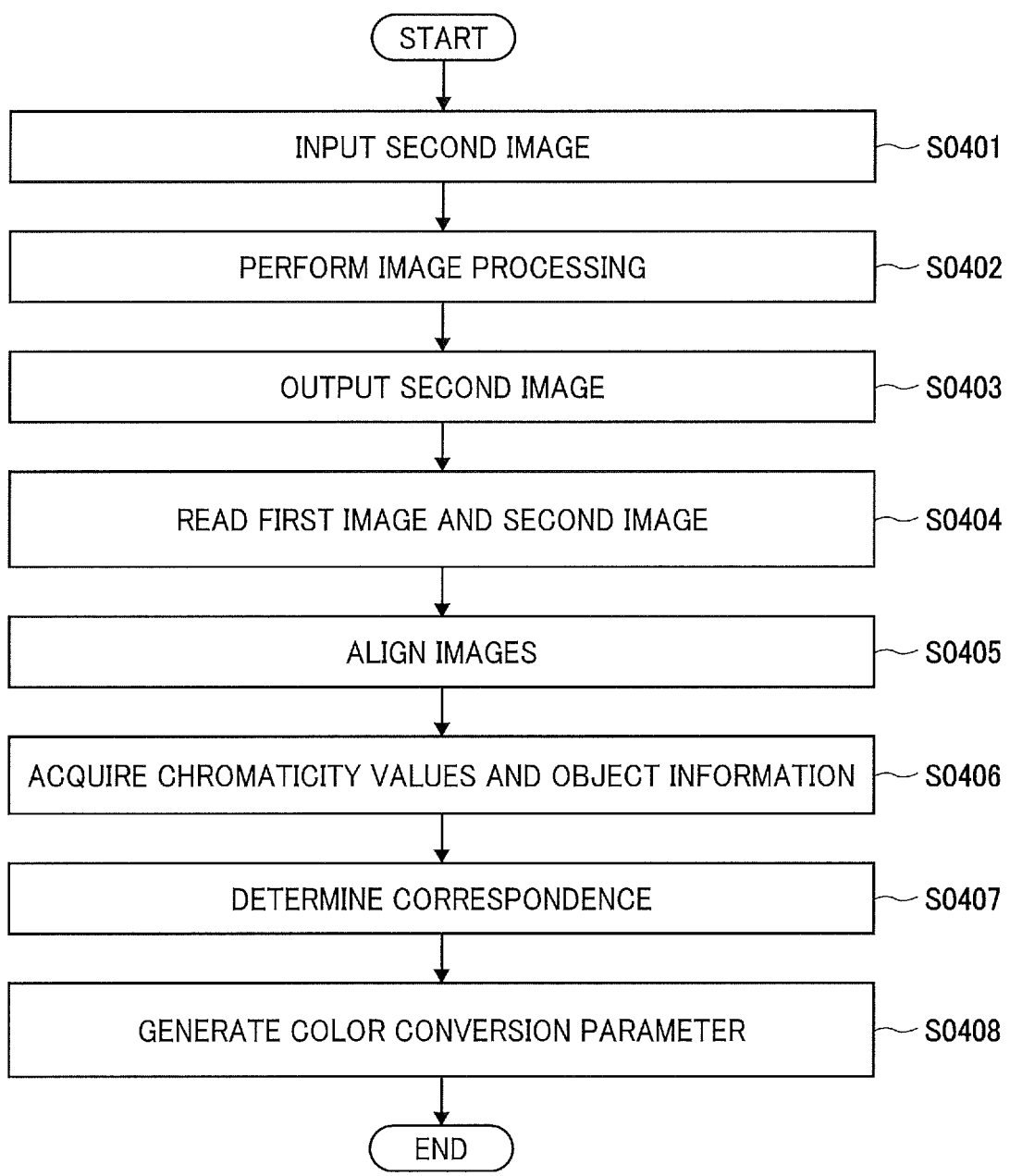

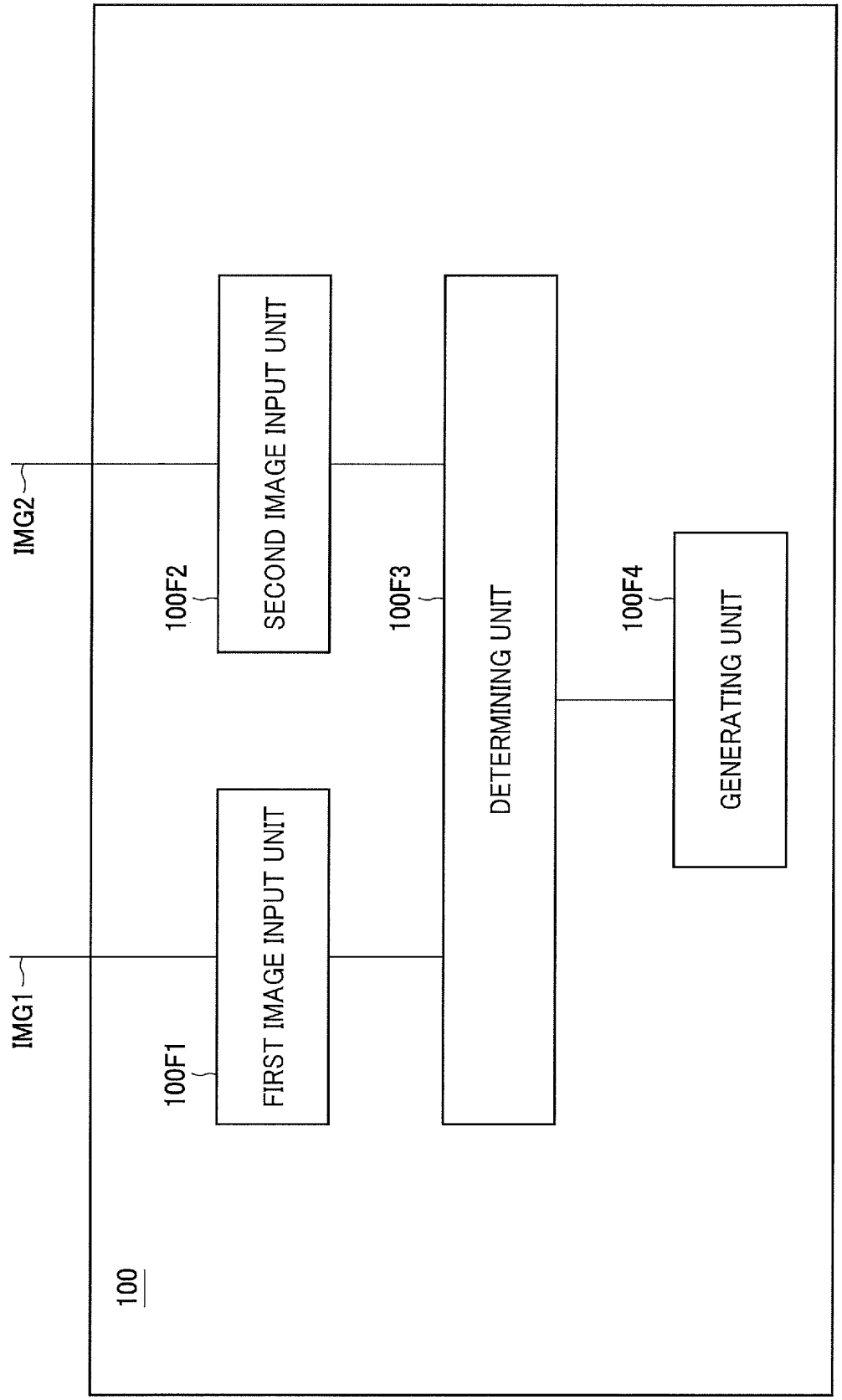

APPARATUS, METHOD, AND SYSTEM FOR PROCESSING IMAGE, AND RECORDING MEDIUM

CROSS-REFERENCE TO RELATED APPLICATIONS

This patent application is based on and claims priority pursuant to 35 U.S.C. § 119(a) to Japanese Patent Application No. 2021-099638, filed on Jun. 15, 2021, in the Japan Patent Office, the entire disclosure of which is hereby incorporated by reference herein.

BACKGROUND

Technical Field

The present disclosure relates to an apparatus for processing an image, a method for processing an image, a system, and a recording medium.

Related Art

There is known a technique for creating a color conversion table to allow an image forming apparatus to form an image such that a target color is reproduced.

Specifically, to create the color conversion table, first, an image forming apparatus performs printing to create a target printed matter indicating the target color. Another image forming apparatus to be subjected to color adjustment performs printing to create a reference printed matter indicating a reference color. The target printed matter and the reference printing matter are read, so that image data representing the target printed matter and image data representing the reference printed matter are acquired. The image data representing the target printed matter and the image data representing the reference printed matter are used to determine a correspondence between chromaticity values, so that the color conversion table is created.

SUMMARY

According to one embodiment of the present disclosure, there is provided an apparatus for processing an image, includes circuitry configured to: input a first image indicating a target color; input a second image formed by an image forming device to be subjected to adjustment; determine types of objects; and compare the first image and the second image and generate, for each of the types of the objects, a color conversion parameter, based on a correspondence between a chromaticity value in the first image and a chromaticity value in the second image.

According to another embodiment of the present disclosure, there is provided a method of processing an image, including inputting a first image indicating a target color; inputting a second image formed by an image forming device to be subjected to adjustment; determining types of objects; and generating, through comparison between the first image and the second image, for each of the types of the objects, a color conversion parameter, based on a correspondence between a chromaticity value in the first image and a chromaticity value in the second image.

According to another embodiment of the present disclosure, there is provided a non-transitory recording medium storing a plurality of instructions which, when executed by one or more processors, cause the processors to perform the above-described method of processing an image.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 is a flowchart illustrating an example of an overall process according to a second embodiment;

FIG. 5 is a diagram illustrating an example of a functional configuration of the image forming apparatus;

Figure 1:
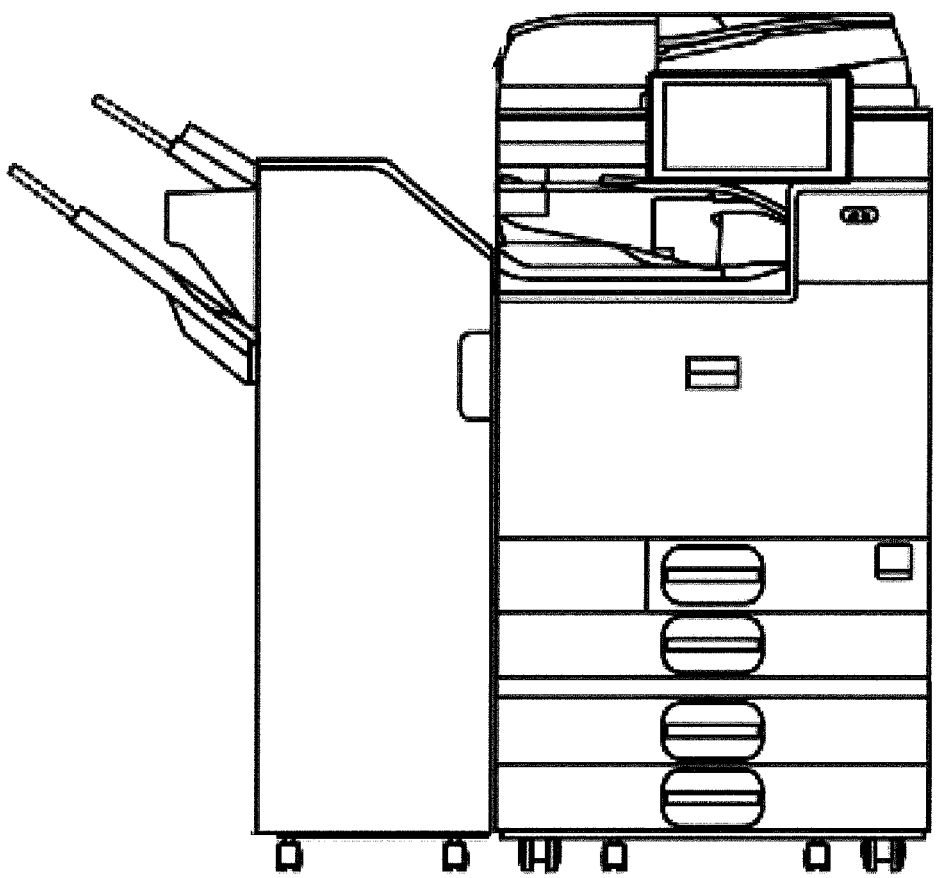
FIG. 1 is a view of an example of an image forming apparatus.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Referring now to the drawings, embodiments of the present disclosure are described below. As used herein, the singular forms "a," "an," and "the" are intended to include the plural forms as well, unless the context clearly indicates otherwise.

Specific examples will be described below with reference to the accompanying drawings. Note that embodiments are not limited to the specific examples described below.

First Embodiment

Example of Image Forming Apparatus

FIG. 1 is a view of an example of an image forming apparatus. The image forming apparatus is, for example, a multifunction peripheral (hereinafter, abbreviated as an "MFP") 100 illustrated in FIG. 1.

As illustrated in FIG. 1, the MFP 100 may include an auto document feeder (ADF), a scanner, a control panel, and a post-processing apparatus, in addition to a printer.

Figure 2:
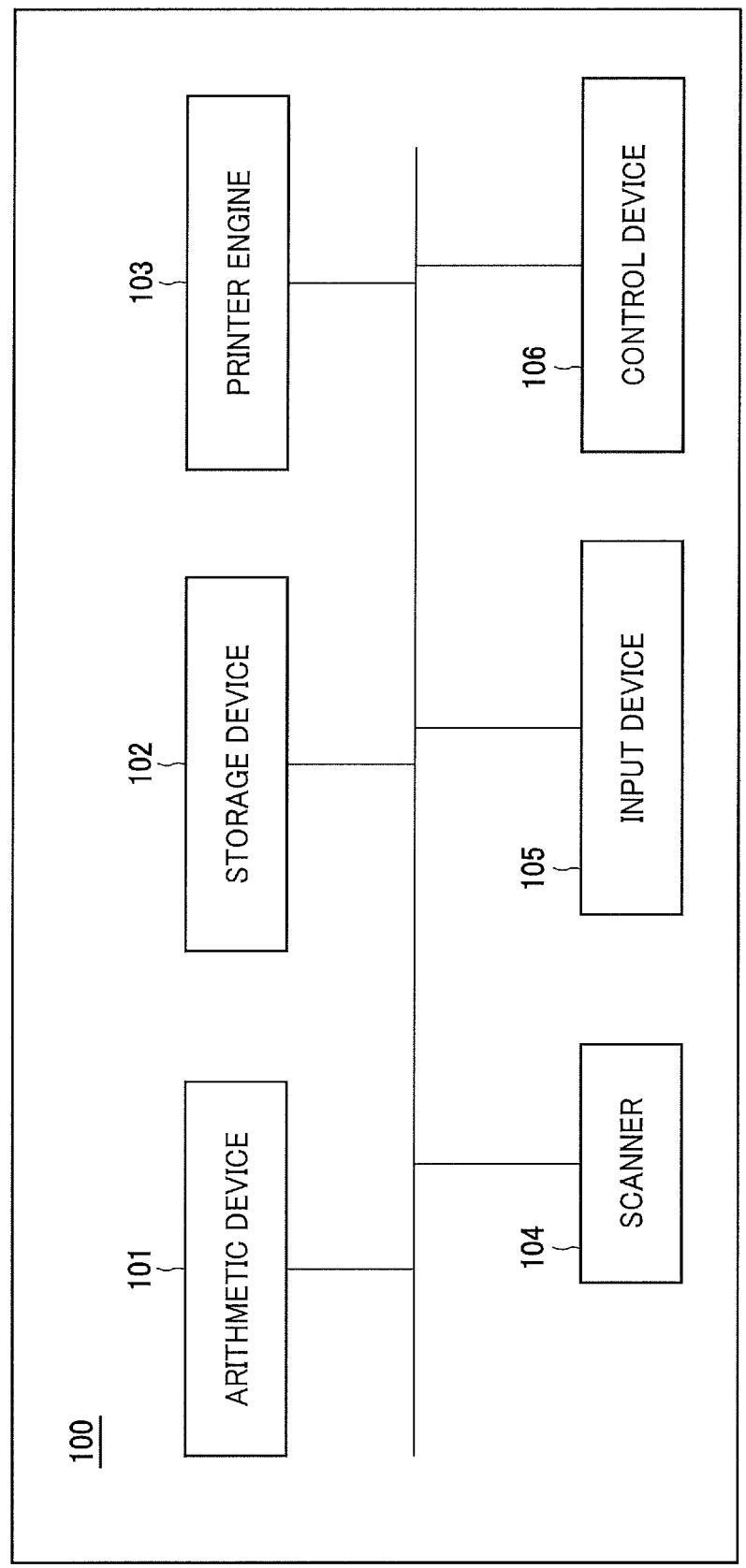
FIG. 2 is a diagram illustrating an example of a hardware configuration of the image forming apparatus.

FIG. 2 is a diagram illustrating an example of a hardware configuration of the image forming apparatus, for example, the MFP 100. For example, the MFP 100 includes an arithmetic device 101, a storage device 102, a printer engine 103, a scanner 104, an input device 105, and a control device 106 in terms of the hardware configuration.

The arithmetic device 101 is, for example, an electronic circuit such as a central processing unit (CPU) or an application specific integrated circuit (ASIC). For example, the arithmetic device 101 performs image processing.

The storage device 102 is, for example, a memory.

The printer engine 103 controls devices that perform a process of exposure, development, charging, cleaning, fixing, and transfer to form an image on a sheet or the like. Of these devices, a device that forms an image, such as the printer, is called an image forming unit or an image forming device.

The scanner 104 is a device that reads an image on a sheet with an optical sensor or the like. The image forming apparatus does not have to be provided with the scanner 104, as long as the image is input to the image forming apparatus.

The input device 105 is a device that inputs data from a peripheral device such as a camera, for example, through a network. The image forming apparatus does not have to be provided with the scanner 104, as long as the image is input to the image forming apparatus.

The control device 106 is a device that controls operations of the devices. The control device 106 may be implemented by a CPU or a circuit such as ASIC. The control device 106 does not have to be provided.

Note that the image forming apparatus is not limited to the MFP 100. That is, the image forming apparatus may be implemented as a system including a reading apparatus such as a scanner that reads an image on a sheet or the like, an image processing apparatus including an arithmetic device or the like for processing an image, and an image forming apparatus that forms an image on a sheet or the like. For example, the reading apparatus, the image processing apparatus, and the image forming apparatus may be different apparatuses connected to each other via a network or the like.

Example of Overall Process

Figure 3:
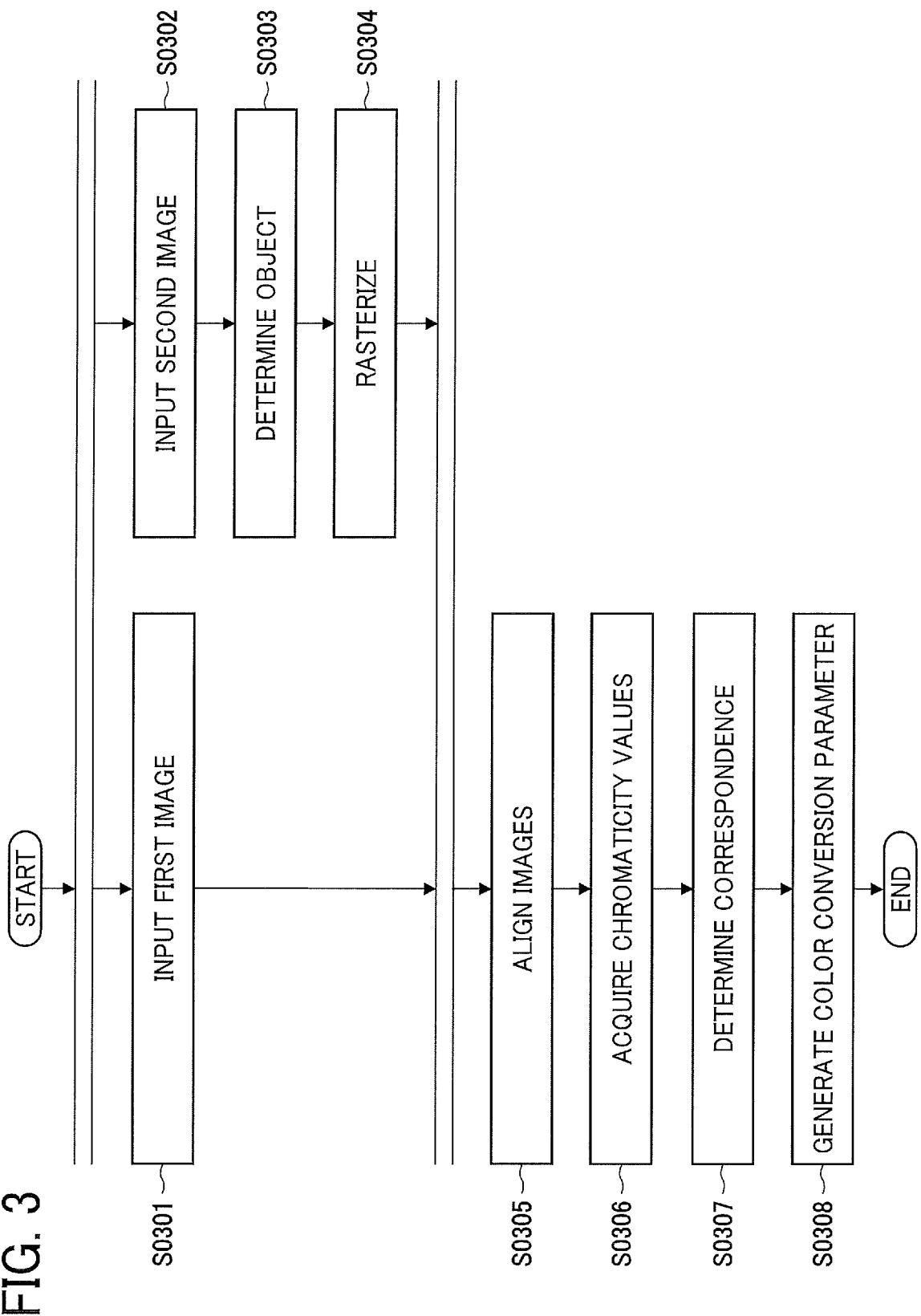
FIG. 3 is a flowchart illustrating an example of an overall process according to a first embodiment.

FIG. 3 is a flowchart illustrating an example of an overall process according to a first embodiment. Hereinafter, an image indicating a target color, that is, a color to be desirably output by the image forming apparatus after adjustment is referred to as a "first image IMG1". An image formed by an image forming unit to be subjected to the adjustment is referred to as a "second image IMG2". That is, the second image is an image indicating a "current state" of a color obtained in image forming when the image forming unit to be subjected to the adjustment performs image forming to attempt to form the first image IMG1 before the adjustment.

In step S0301, the first image IMG1 is input to the image forming apparatus. For example, in the case of reproducing a color of a printed matter created by another adjusted printer, the first image IMG1 is input in response to reading the printed matter with the scanner.

In step S0302, the second image IMG2 is input to the image forming apparatus. For example, data representing the second image IMG2 is input to the image forming apparatus. That is, in the first embodiment, the second image IMG2 is an image yet to be formed.

In step S0303, the image forming apparatus determines an object included in the second image IMG2. The object determination is desirably performed before rasterization (may also be referred to as "raster image processing (RIP)" or the like) as in step S0303. If an object is determined at such a timing, the image forming apparatus can accurately acquire a signal value of the second image IMG2 and an object represented by each pixel in association with each other.

In step S0304, the image forming apparatus rasterizes the second image IMG2. That is, through rasterization, the image forming apparatus converts the second image IMG2 into a raster image.

The result of the object determination may be embedded in image data as additional information, or may be treated as a different file.

In step S0305, the image forming apparatus performs alignment of the images. The alignment may be implemented by, for example, pattern matching or phase-only correlation. Alternatively, the alignment may involve processing of performing a geometric transformation such as an affine transformation.

In step S0306, the image forming apparatus acquires chromaticity values. Specifically, first, the image forming apparatus determines a region of interest in data representing the first image IMG1 and data representing the second image IMG2. The image forming apparatus then acquires chromaticity values of the region of interest.

Based on the respective pieces of data, the chromaticity values are represented, for each region of interest, in a first color space for handling the first image IMG1 and in a second color space for handling the second image IMG2. The same color space may be used as the first color space and the second color space.

The region of interest is, for example, in units of pixels. However, the region of interest may be set as a certain range such as "5 pixels×5 pixels", and a statistical value such as an average value may be calculated in the region of interest to acquire the chromaticity value.

In step S0307, the image forming apparatus determines, for each object, a correspondence between the chromaticity values. That is, based on the result of the object determination, the image forming apparatus determines a correspondence indicating which chromaticity value in the second image IMG2 corresponds to the chromaticity value indicated in the first image IMG1.

In step S0308, the image forming apparatus generates a color conversion parameter. For example, the color conversion parameter may be in a form of an International Color Consortium (ICC) profile or the like. Thus, once the color conversion parameter is determined, which color is to be associated with an input image to perform image forming is set in the image forming apparatus.

Note that the steps of the overall process are not necessarily performed in the order illustrated in FIG. 3. For example, the step of inputting the first image and the step of inputting the second image are not necessarily performed in parallel but may be performed sequentially.

The image forming apparatus desirably determines whether there is a difference in the correspondence depending on the type of the object. In accordance with a result of the difference determination, the image forming apparatus changes a method for generating the color conversion parameter.

For example, in the overall process, the image forming apparatus first determines a correspondence between the chromaticity values, for at least one object. Specifically, the image forming apparatus generates a color conversion parameter for converting the chromaticity value in the first color space to the chromaticity value in the second color space. The image forming apparatus then uses the same color conversion parameter to perform color conversion for an object of a type different from the type for which the color conversion parameter has been generated. In this manner, the image forming apparatus performs the same color conversion for the different types of objects. As a result, the image forming apparatus compares the chrominance value of each of the objects in the second image IMG2 with the chromaticity value that is the result of the color conversion. For example, an index such as International Commission of Illumination (CIE) 2000, CIE No. 15:2004 (hereinafter, referred to as "ΔE00 color difference") may be used to compare the chromaticity values with each other.

The image forming apparatus then determines that there is no difference in the correspondence depending on the type of the object if the results of the same color conversion for the different types of objects are within a predetermined threshold value.

The threshold value is a value set in advance. Specifically, when the ΔE00 color difference is used in comparison of the chromaticity values, the threshold value is set to "3.2" or the like. Thus, if conversion can be performed such that the ΔE00 color difference is within the value of "3.2", the image forming apparatus determines that there is no difference in the correspondence depending on the type of the object.

Note that a value other than "3.2" may be set as the threshold value. For example, a smaller threshold value may be set in a printer with high stability, that is, an image forming apparatus capable of forming an image with stable colors.

Specifically, an image forming apparatus that has high stability and high reproducibility of colors in image forming is capable of reproducing the same colors to form an image even if the image forming apparatus performs image forming a plurality of times. In such a case, a smaller threshold value is desirably set.

On the other hand, a greater threshold value is desirably set in a printer with low stability. As described above, if the threshold value is set in consideration of the stability or the like of the image forming apparatus, the difference in the correspondence can be accurately determined.

If colors included in objects deviate, it may be difficult for the image forming apparatus to accurately determine whether there is a difference in the correspondence. For example, the image forming apparatus calculates the Euclidean distance between the chromaticity value in the first color space corresponding to the type of an object of interest and the chromaticity value in the first color space corresponding to a type different from the type of the object of interest. If the minimum value of the Euclidean distance is greater than or equal to a predetermined value, the image forming apparatus determines that it is difficult to determine whether there is a difference in the correspondence.

As described above, when it is difficult to determine whether there is a difference in the correspondence, the image forming apparatus may use the correspondence for the case where it is difficult to accurately determine whether there is a difference in the correspondence. Specifically, a target color of red (R, G, B)=(255, 0, 0) is defined in advance as (L, a, b)=(53, 80, 67). If the first image IMG1 and the second image IMG2 do not include a color close to red (R, G, B)=(255, 0, 0), the image forming apparatus adds this correspondence to generate the color conversion parameter. This allows the image forming apparatus to generate a generic color conversion parameter even when the number of colors used in an object is small.

When it is difficult to determine whether there is a difference in the correspondence, the image forming apparatus may add a color of a hue that is present in a predetermined object to generate the color conversion parameter. That is, the image forming apparatus may add a lacking color in the correspondence, to generate the color conversion parameter. Specifically, when generating the color conversion parameter for a character object in image data in which a photo object includes data of red but the character object does not include a color close to red, the image forming apparatus can add a target color of red of the photo object to generate the color conversion parameter. Thus, when a lacking color is added, highly accurate color conversion can be performed in the entire color space.

Regarding Object

Objects are classified into types such as a character, a chart/diagram, a photo, a line, or a graphic, for example. Thus, object information indicates a type of each object. For example, the object information is set in advance or in an operating system (OS).

Specifically, based on comparison between the first image IMG1 and the second image IMG2, the image forming apparatus first generates a color conversion parameter for a photo object. The image forming apparatus then uses the color conversion parameter generated for photos to perform image forming of objects of types other than photos.

As described above, in the case where an image can be formed in a color close to the target color even though the color conversion parameter for a different type of object is used, the image forming apparatus may determine that there is no difference in the correspondence between the different types of objects. As described above, for different types of objects between which there is no difference in the correspondence, a common color conversion parameter may be used, that is, the color conversion parameter is not necessarily changed.

Second Embodiment

A second embodiment is different from the first embodiment in the overall process. Differences from the first embodiment will be mainly described below.

FIG. 4 is a flowchart illustrating an example of an overall process according to the second embodiment.

In step S0401, the second image IMG2 is input to the image forming apparatus.

In step S0402, the image forming apparatus performs image processing. For example, before forming the second image IMG2, the image forming apparatus performs so-called pre-processing such as rasterization, color conversion, or gradation processing on data representing the second image IMG2.

In step S0403, the image forming apparatus outputs the second image IMG2. That is, based on the data resulting from the pre-processing in step S0402, the image forming apparatus forms the second image IMG2 on a sheet or the like.

In step S0404, the image forming apparatus reads and receives the first image IMG1 and the second image IMG2. For example, the image forming apparatus reads a printed matter on which the first image IMG1 and the second image IMG2 have been formed, so that the first image IMG1 and the second image IMG2 are input to the image forming apparatus.

In step S0405, the image forming apparatus performs alignment of the images. For example, the processing of step S0405 is substantially the same as the processing of step S0305.

In step S0406, the image forming apparatus acquires chromaticity values and object information. In the image processing in step S0402, the color conversion parameter is changed for each object. In step S0406, the image forming apparatus acquires object information from the second image IMG2.

In step S0407, the image forming apparatus determines the correspondence. For example, the processing of step S0407 is substantially the same as the processing of step S0307.

In step S0408, the image forming apparatus generates the color conversion parameter. For example, the processing of step S0408 is substantially the same as the processing of step S0308.

In steps S0401 to S0404, the image forming apparatus receives, pre-processes, and forms the second image IMG2 once, and then receives the second image IMG2 again through reading.

In step S0402, the color conversion parameter may be changed such that different output ranges are set for different types of objects.

A case where an image includes two objects will be described below as an example. Color conversion is performed for one of the two objects such that a hue angle is in a range from 0° to 180°. On the other hand, color conversion is performed for the other object of the two objects such that the hue angle is in a range from 180° to 360°. In this example, the image forming apparatus generates the color conversion parameter so that color conversion is performed such that the hue angle changes depending on the object.

Therefore, if the image forming apparatus uses such a color conversion parameter in image forming, the image forming apparatus can form an image such that the different objects have different colors because the objects are in different phases. When the image is formed such that the objects have different colors, it is easier to determine the objects from the second image IMG2 because the colors are different.

Note that the range of the hue angle is set in advance for an object, for example. The output range may be set as a range other than the range of the hue angle. For example, the output range may be set based on brightness or the like.

As described above, the image forming apparatus may generate the color conversion parameter such that the output ranges for respective objects, that is, results of the color conversion are non-overlapping ranges.

For example, the image may be divided into a plurality of pages, and just one object may be output on each page.

Example of Functional Configuration

FIG. 5 is a block diagram illustrating an example of a functional configuration of the control section of the image forming apparatus. The image forming apparatus, for example, the MFP 100 includes, for example, a first image input unit 100F1, a second image input unit 100F2, a determining unit 100F3, and a generating unit 100F4. Since the control section only relates to image processing, the image forming apparatus having the functional configuration of FIG. 5 may be referred to as an image processing apparatus.

The first image input unit 100F1 performs a first image input step of inputting the first image IMG1. For example, the first image input unit 100F1 is implemented by the arithmetic device 101 (such as CPU), which receives the first image from the scanner 104, the input device 105, or the like.

The second image input unit 100F2 performs a second image input step of inputting the second image IMG2. For example, the second image input unit 100F2 is implemented by the arithmetic device 101 (such as CPU), which receives the second image, for example, from the scanner 104, the input device 105, or the like.

The determining unit 100F3 performs a determination step of determining the type of an object. For example, the determining unit 100F3 is implemented by the arithmetic device 101 or the like.

The generating unit 100F4 performs a generation step of generating, through comparison between the first image IMG1 and the second image IMG2, for each type of the object, the color conversion parameter, based on a correspondence between chromaticity values. For example, the generating unit 100F4 is implemented by the arithmetic device 101 or the like.

An image forming apparatus such as a printer may change processing or the like for each object included in an image. On the other hand, if the color conversion parameter is generated without taking into account the types of objects in the correspondence between the target color and the color currently formed by the image forming unit to be subjected to adjustment, that is, the correspondence between the first image IMG1 and the second image an image is formed such that the different types of objects have the same color. Thus, the color conversion accuracy decreases.

Accordingly, the image forming apparatus first determines an object included in an image. In this manner, the image forming apparatus takes into account the type of the object or the like in generating the color conversion parameter. This allows the image forming apparatus to use different color conversion parameters for different types of objects. Thus, the color conversion accuracy can be increased.

In FIG. 5, the image forming unit that forms an image may be additionally provided as a part of the functional configuration. Specifically, the image forming unit forms an image, based on the color conversion parameter generated by the generating unit 100F4.

Figure 6A:
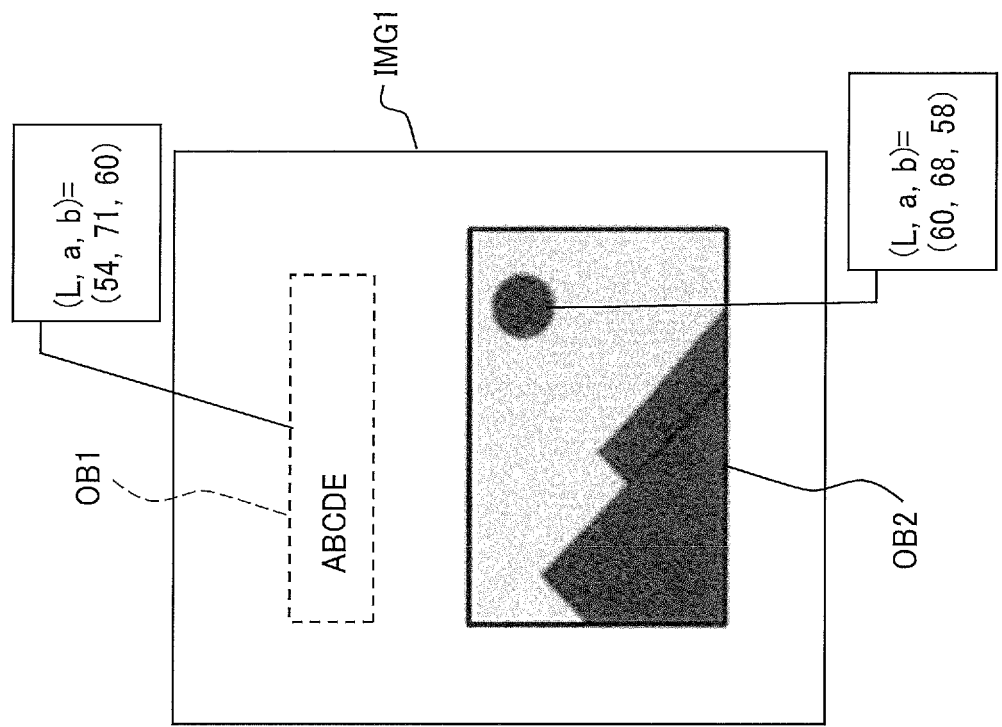
FIGS. 6A and 6B are diagrams illustrating an example in which different colors are set for different types of objects.
Figure 6B:
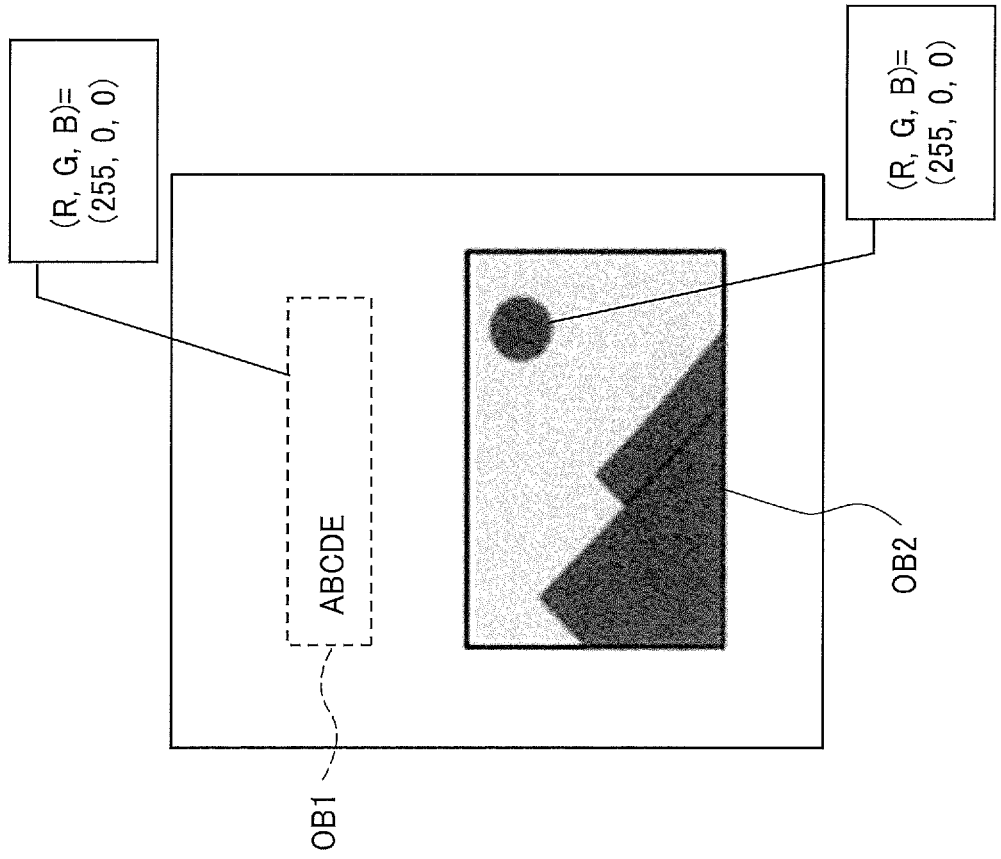

FIGS. 6A and 6B are diagrams illustrating an example in which different colors are set for different types of objects. A case with conditions illustrated in FIGS. 6A and 6B will be described below as an example.

FIG. 6A is a diagram illustrating an example of data representing a target to be printed. For example, it is assumed that data having content illustrated in FIG. 6A is input to the image forming apparatus and the image forming apparatus then forms a corresponding image.

FIG. 6B is a diagram illustrating an example of a printed result. That is, FIG. 6B illustrates an example of an image formed in response to input of the data illustrated in FIG. 6A.

As illustrated in FIGS. 6A and 6B, the data includes different types of objects, i.e., a character object (hereinafter referred to as a "first object OB1") and a photo object (hereinafter referred to as a "second object OB2").

For example, the color is designated as an RGB value in the data. It is assumed below that the same RGB value, that is, "(R, G, B)=(255, 0, 0)", is set for both the first object OB1 and the second object OB2 in the data as illustrated in FIG. 6A. Therefore, both the first object OB1 and the second object OB2 are in "red" in the data.

On the other hand, it is assumed that the first object OB1 and the second object OB2 are intended to have different colors in a result of image formation. Specifically, as illustrated in FIG. 6B, the first object OB1 has a color of "(L, a, b)=(54, 71, 60)". On the other hand, the second object OB2 has a color of "(L, a, b)=(60, 68, 58)". As described above, even though the same color is designated for different types of objects in data, a setting may be made so that an image is formed such that the different types of objects have different colors by changing processing in accordance with the types of the objects. In the printed first image the first object OB1 is "red", whereas the second object OB2 is "orange".

In such a case, the image forming apparatus forms the first image IMG1 on a sheet or the like in order to indicate which colors are to be formed. Thus, if the image forming apparatus reads the first image IMG1, the image forming apparatus can grasp the target color.

On the other hand, the color conversion parameter, that is, how the color is currently formed by the image forming apparatus, can be grasped if the image forming apparatus reads the second image IMG2 formed based on the data having the content illustrated in FIG. 6A. For example, if the types of the objects are not taken into account, a result described below is obtained.

Figure 7B:
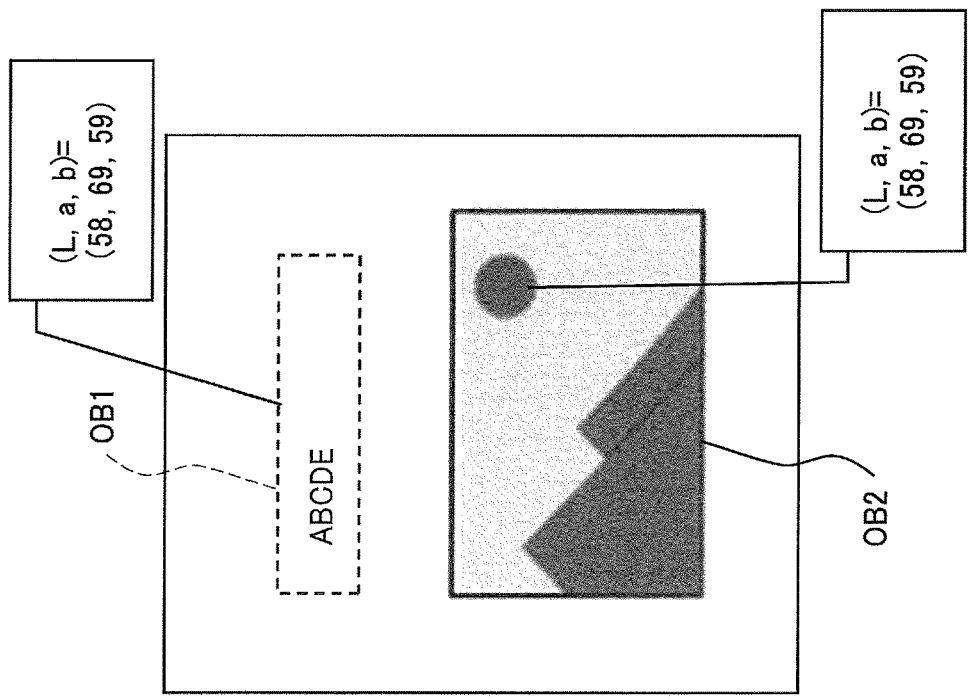
FIGS. 7A and 7B are diagrams illustrating an example in which types of objects are not taken into account.
Figure 7A:
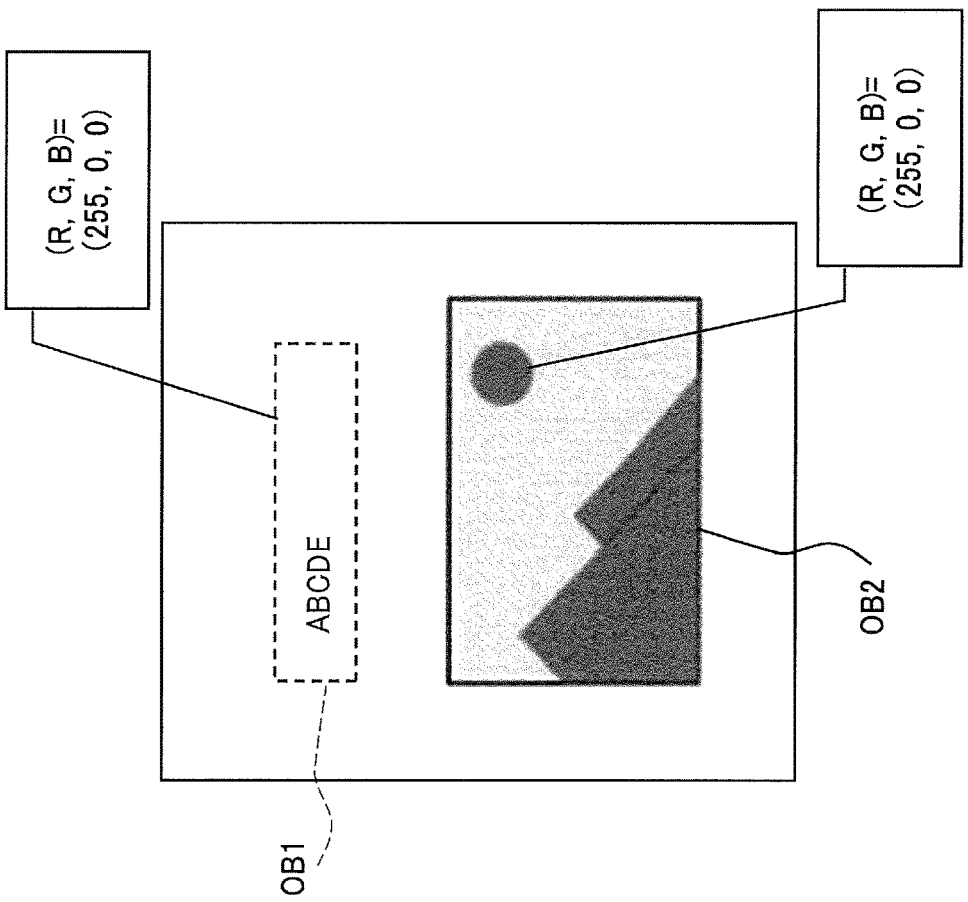

FIGS. 7A and 7B are diagrams illustrating an example in which types of objects are not taken into account. As illustrated in FIG. 7A, data that is the same as the data illustrated in FIG. 6A is input to an image forming apparatus that does not take into account the types of objects, and the image forming apparatus forms an image.

When the types of the objects are not taken into account, for example, a result illustrated in FIG. 7B is obtained. In contrast to FIG. 6B, both the first object OB1 and the second object OB2 have a color of "(L, a, b)=(58, 69, 59)". That is, even through the first object OB1 and the second object OB2 are intended to have different colors as illustrated in FIG. 6B, if the types of the objects are not taken into account, the same color conversion parameter is used to perform processing. Consequently, a result illustrated in FIG. 7B may be obtained.

Thus, through comparison between the first image IMG1 and the second image IMG2, the image forming apparatus can grasp a correspondence as to whether to change the color depending on the types of the objects.

When the color conversion parameter is generated by taking into account the types of the objects, a result described below can be obtained.

Figure 8B:
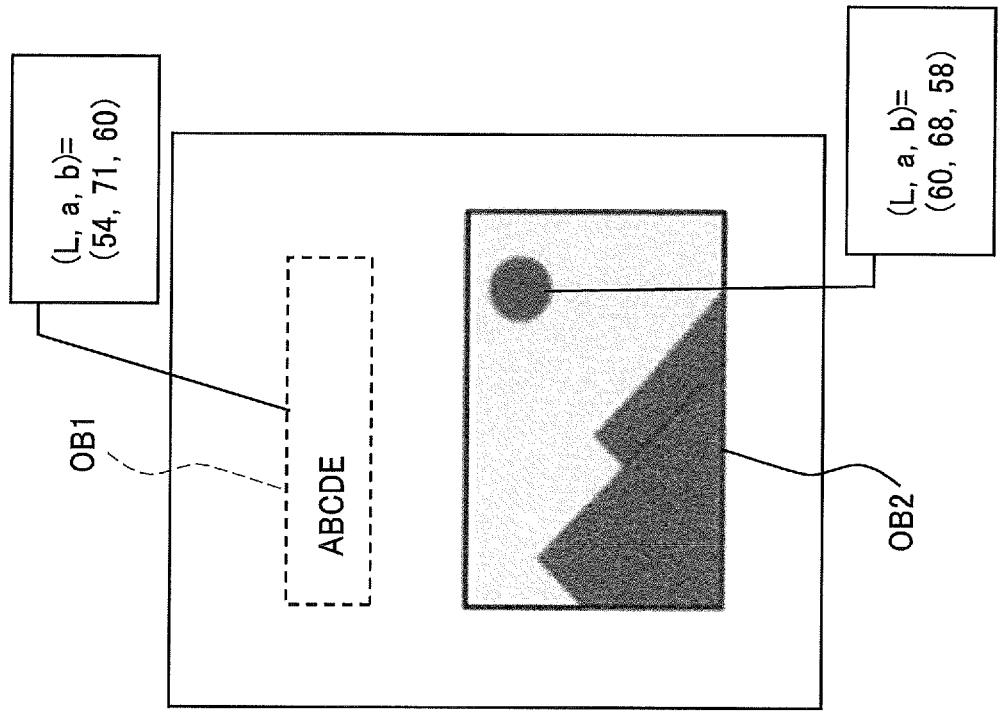
FIGS. 8A and 8B are diagrams illustrating an example in which types of objects are taken into account.
Figure 8A:
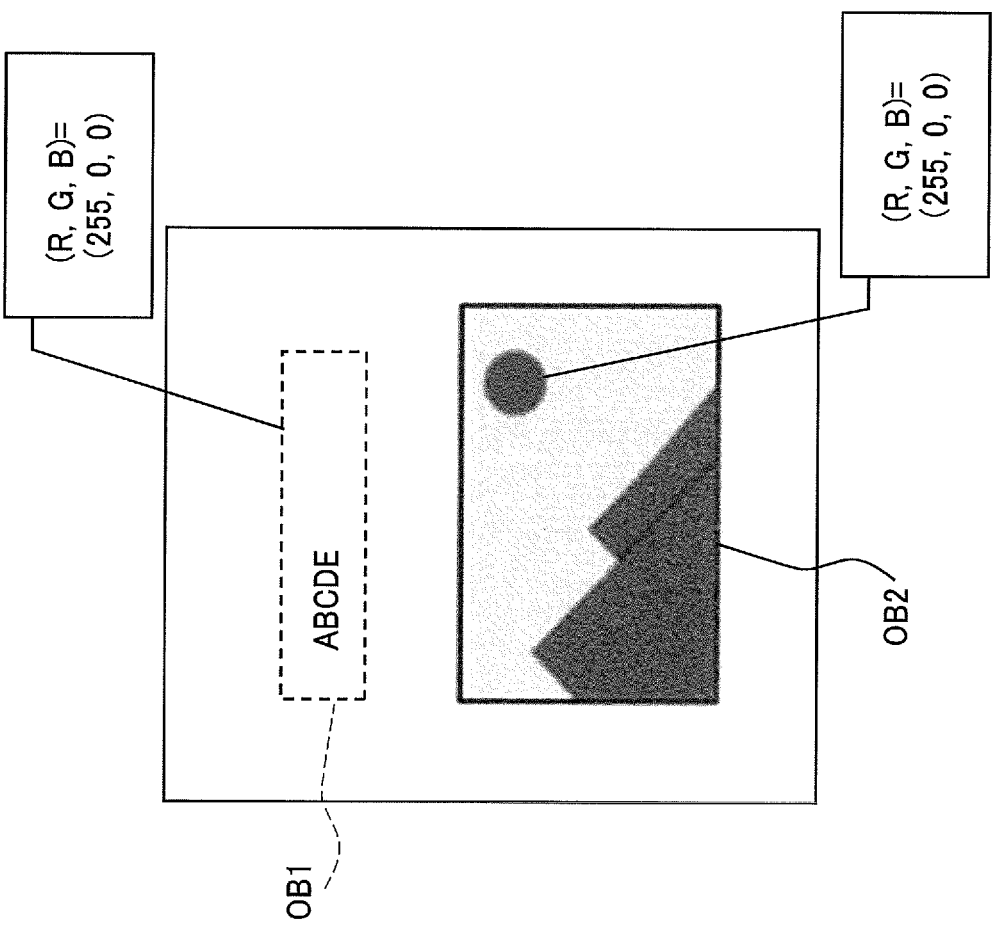

FIGS. 8A and 8B are diagrams illustrating an example in which types of objects are taken into account. As compared with FIGS. 7A and 7B, the same data as the data illustrated in FIG. 7A is used as illustrated in FIG. 8A, which is the same also in FIGS. 8A and 8B. On the other hand, as illustrated in FIG. 8B, when the types of the objects are taken into account, the first object OB1 has a color of "(L, a, b)=(54, 71, 60)". On the other hand, the second object OB2 has a color of "(L, a, b)=(60, 68, 58)".

That is, the result illustrated in FIG. 8B matches the result illustrated in FIG. 6B, and thus is a result in which the image is formed as intended. As described above, the image forming apparatus can increase the color conversion accuracy when the image forming apparatus takes into account the types of objects.

In the example illustrated in FIGS. 6A and 6B, an image is formed using the same color conversion parameter for the first object OB1 and the second object OB2 to determine whether there is a difference in the correspondence. The image forming apparatus first generates the color conversion parameter for the first object OB1, that is, a character object. Hereinafter, the color conversion parameter for a character object is referred to as a "first color conversion parameter".

The first color conversion parameter is generated based on the correspondence illustrated in FIGS. 6A and 6B.

The image forming apparatus uses the first color conversion parameter in image formation of an object of a type other than the character, that is, the second object OB2, and determines whether there is a difference in the correspondence. As described above, even though the color conversion parameter for another type of object is used, if an error of the color conversion is within a threshold value, the image forming apparatus determines that there is no difference in the correspondence.

Through the determination described above, the image forming apparatus can determine whether there is a difference in the correspondence between colors of objects.

When there is a difference in the correspondence, the image forming apparatus generates a different color conversion parameter for each object. Specifically, when there is a difference in the correspondence, the image forming apparatus generates a color conversion parameter (hereinafter referred to as a "second color conversion parameter") for the second object OB2 separately from the first color conversion parameter. As described above, when the image forming apparatus uses the first color conversion parameter and the second color conversion parameter in a switched manner, the image forming apparatus can form the first object OB1 and the second object OB2 in different colors.

When there is no difference in the correspondence, the image forming apparatus generates a color conversion parameter common to different types of objects. Specifically, when there is no difference in the correspondence, the image forming apparatus uses the first color conversion parameter in common for both the first object OB1 and the second object OB2. This can reduce the number of color conversion parameters.

When the common color conversion parameter is used without switching, a fluctuation in color in a plane can be reduced.

For example, part of the process of the image forming method described above may be implemented by a program such as firmware. That is, the image forming method is a method executed by a computer as a result of the computer causing an arithmetic device, a storage device, an input device, an output device, and a control device to operate in cooperation with each other based on the program. The program may be distributed after being written in a storage device, a storage medium, or the like, or may be distributed through an electric communication line or the like.

The image forming apparatus described above is not necessarily a single apparatus. That is, the image forming apparatus may be an image forming system including a plurality of apparatuses. For example, the image forming system may be a combination of a scanner, an information processing apparatus, and a printer that are connected to one another via a network. In such case, the scanner operates as the first image input unit 100F1, the information processing apparatus operates as the second image input unit 100F2, determining unit 100F3, and generating unit 100F4. The printer operates as the image forming unit.

In yet another example, the image forming apparatus may be implemented by a scanner apparatus including the scanner that operates as the first image input unit 100F1, the input device that operates as the second image input unit, and the CPU or control circuit that operates as the determining unit 100F3 and the generating unit 100F4. In such case, the image forming apparatus operates as an image processing apparatus.

The image forming apparatus may be, for example, a commercial printer (for example, a large electrophotographic printer or inkjet printer).

The recording medium is, for example, paper (also referred to as "plain paper" or the like). Alternatively, the recording medium may be coated or label paper other than the paper, an overhead projector sheet, a film, a flexible thin plate, or the like. The recording medium may also be roll paper or the like.

Specifically, the recording medium is a medium such as paper, a film, or cloth on which recording is performed.

As described above, the material of the recording medium is paper, thread, fiber, fabric, leather, metal, plastic, glass, wood, ceramics, or any combination thereof.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An apparatus for processing an image, comprising:
   circuitry configured to:
   input a first image indicating a target color;
   input a second image formed by an image forming device to be subjected to adjustment;
   determine types of objects included in each of the first image and the second image;
   compare the first image and the second image to align the first image and the second image based on one of pattern matching, phase-only correlation, or geometric transformation;
   determine a region of interest in data representing the first image and a corresponding region of interest in data representing the second image that have been aligned;
   acquire a chromaticity value of the region of interest in the data representing the first image and a chromaticity value of the corresponding region of interest in the data representing the second image;
   determine, for each of the types of the objects, a correspondence between the chromaticity value of the region of interest in the data representing the first image and the chromaticity value of the corresponding region of interest in the data representing the second image; and
   generate a color conversion parameter for each of the types of the objects.

2. The apparatus according to claim 1, wherein the circuitry is configured to
   determine the types of the objects in rasterization of the second image.

3. The apparatus according to claim 1, wherein the circuitry is configured to
   determine whether there is a difference in the correspondence depending on the types of the objects,
   in a case where there is a difference in the correspondence depending on the types of the objects, generate the color conversion parameter that is different for each of the types of the objects, and
   in a case where there is no difference in the correspondence depending on the types of the objects, generate the color conversion parameter that is to be used in common for the different types of the objects.

4. The apparatus according to claim 3, wherein the circuitry is configured to
   use the color conversion parameter generated for image formation of a first object among the objects, for a second object different from the first object among the objects, to determine whether there is a difference in the correspondence.

5. The apparatus according to claim 3, wherein the circuitry determines there is no difference in the correspondence in a case where an error of the color conversion is within a threshold value.

6. The apparatus according to claim 1, wherein the second image has different output ranges for the different types of objects.

7. The apparatus according to claim 1, wherein the circuitry is configured to
   add a lacking color to generate the color conversion parameter, in a case where the circuitry is unable to determine whether there is a difference in the correspondence.

8. A system comprising:
   the apparatus of claim 1; and
   a scanner configured to input the first image to the apparatus.

9. The apparatus according to claim 1, wherein
   the region of interest in the data representing the first image and the corresponding region of interest in the data representing the second image both have an area of a specified number of pixels, and
   the chromaticity value of the region of interest and of the corresponding region of interest are averages of the chromaticity values for each of the region of interest and of the corresponding region of interest.

10. The apparatus according to claim 1, wherein the circuitry if configured to align the first image and the second image base on an affine transformation.

11. A method of processing an image, comprising:
    inputting a first image that is an image indicating a target color;
    inputting a second image that is an image formed by an image forming device to be subjected to adjustment;
    determining types of objects included in each of the first image and the second image;
    comparing the first image and the second image to align the first image and the second image based on one of pattern matching, phase-only correlation, or geometric transformation;
    determining a region of interest in data representing the first image and a corresponding region of interest in data representing the second image that have been aligned;
    acquiring a chromaticity value of the region of interest in the data representing the first image and a chromaticity value of the corresponding region of interest in the data representing the second image;
    determining, for each of the types of the objects, a correspondence between the chromaticity value of the region of interest in the first image and the chromaticity value of the corresponding region of interest in the second image; and generating a color conversion parameter for each of the types of the objects.

12. The method according to claim 11, wherein
the region of interest in the data representing the first image and the corresponding region of interest in the data representing the second image both have an area of a specified number of pixels, and
the chromaticity value of the region of interest and of the corresponding region of interest are averages of the chromaticity values for each of the region of interest and of the corresponding region of interest.

13. The method according to claim 11, wherein the circuitry if configured to align the first image and the second image base on an affine transformation.

14. The method according to claim 11, further comprising:
determining whether there is a difference in the correspondence depending on the types of the objects, wherein it is determined that there is no difference in the correspondence in a case where an error of the color conversion is within a threshold value.

15. A non-transitory recording medium storing a plurality of instructions which, when executed by one or more processors, cause the processors to perform a method of processing an image, the method comprising:
inputting a first image that is an image indicating a target color;
inputting a second image that is an image formed by an image forming device to be subjected to adjustment;
determining types of objects included in each of the first image and the second image;
comparing the first image and the second image to align the first image and the second image based on one of pattern matching, phase-only correlation, or geometric transformation;

determining a region of interest in data representing the first image and a corresponding region of interest in data representing the second image that have been aligned;
acquiring a chromaticity value of the region of interest in the data representing the first image and a chromaticity value of the corresponding region of interest in the data representing the second image;
determining, for each of the types of the objects, a correspondence between the chromaticity value of the region of interest in the data representing the first image and the chromaticity value of the corresponding region of interest in the data representing the second image; and
generating a color conversion parameter for each of the types of the objects.

16. The non-transitory recording medium according to claim 15, wherein the region of interest in the data representing the first image and the corresponding region of interest in the data representing the second image both have an area of a specified number of pixels, and
the chromaticity value of the region of interest and of the corresponding region of interest are averages of the chromaticity values for each of the region of interest and of the corresponding region of interest.

17. The non-transitory recording medium according to claim 15, wherein the circuitry is configured to align the first image and the second image base on an affine transformation.

18. The non-transitory recording medium according to claim 15, wherein the circuitry is configured to
determine whether there is a difference in the correspondence depending on the types of the objects, wherein the circuitry determines there is no difference in the correspondence in a case where an error of the color conversion is within a threshold value.

* * * * *